Aug. 27, 1968     SHINKICHI GOTO ET AL     3,398,943
APPARATUS FOR SCARFING ROLLED METAL MATERIALS
Filed July 12, 1965     3 Sheets-Sheet 1
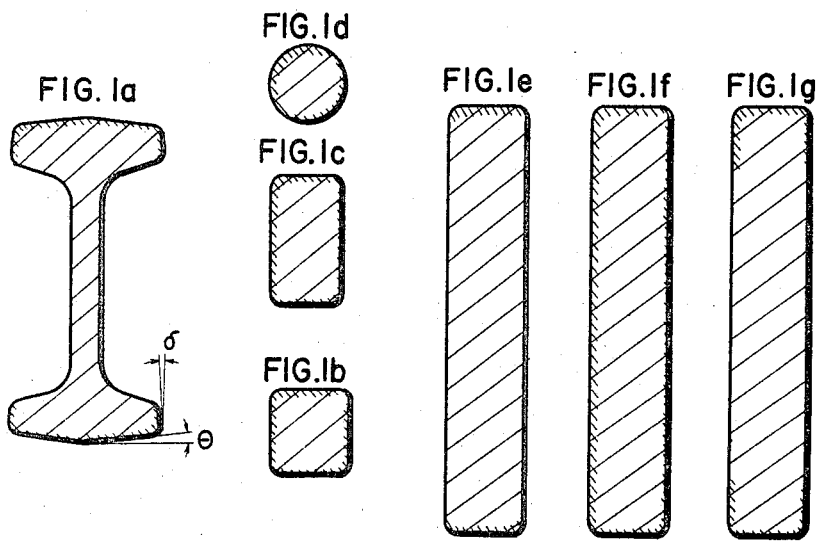
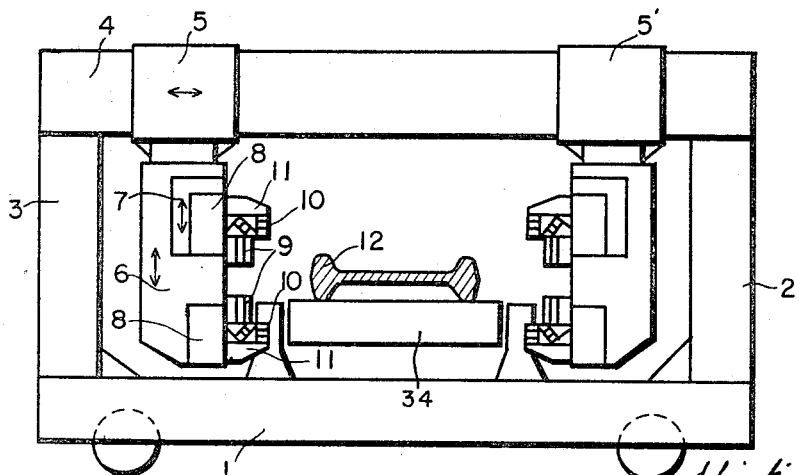

Aug. 27, 1968    SHINKICHI GOTO ET AL    3,398,943
APPARATUS FOR SCARFING ROLLED METAL MATERIALS
Filed July 12, 1965    3 Sheets-Sheet 2
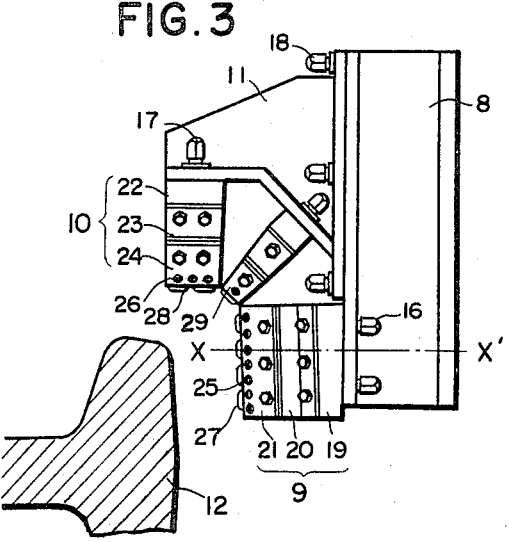
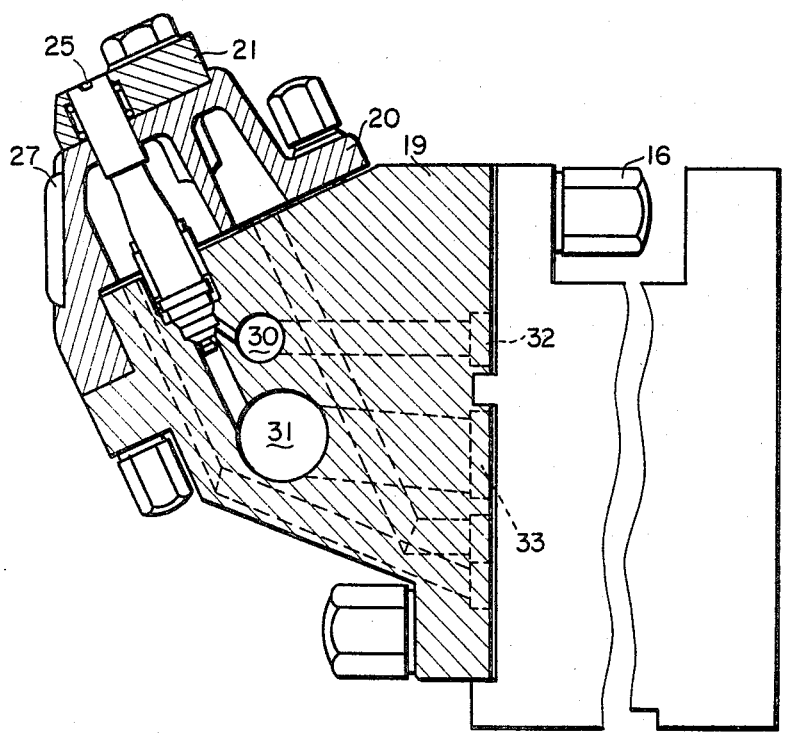

FIG. 5
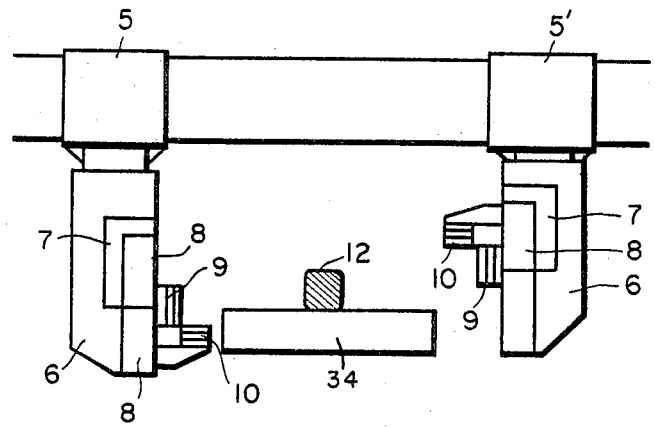
FIG. 6   FIG. 7   FIG. 8
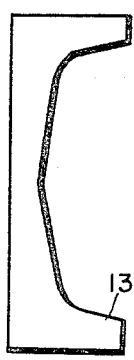
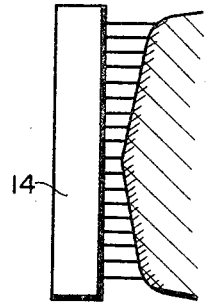
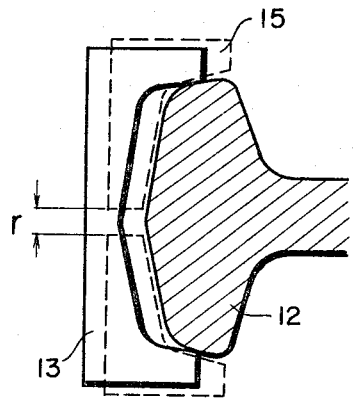

United States Patent Office 3,398,943
Patented Aug. 27, 1968

3,398,943
APPARATUS FOR SCARFING ROLLED
METAL MATERIALS
Shinkichi Goto, Kitakyushu, and Bunnosuke Ushioda, Tokyo, Japan, assignors to Yawata Iron & Steel Co., Ltd., and Tanaka Engineering Works, Ltd., Tokyo, Japan
Filed July 12, 1965, Ser. No. 471,197
Claims priority, application Japan, July 18, 1964, 39/40,774
4 Claims. (Cl. 266—23)

ABSTRACT OF THE DISCLOSURE

A scarfing apparatus which can be applied to rolled metal members of any shape and wherein a nozzle supporter is provided on the lower part of a vertically slidable body capable of moving in horizontal and vertical directions, and a subsidiary slidable body capable of moving vertically is provided on the upper part of said vertically slidable body, so that the upper and lower surfaces and upper lower portions of the side surfaces of a rolled member to be scarfed can be simultaneously scarfed in a short time.

---

The present invention relates to an apparatus for scarfing the surfaces of various metallic materials, and more particularly, to an apparatus for scarfing such metallic materials having complicated shapes as rolled H-shaped steel members.

In cogging mills in iron works and the like, rolled metal materials have so far been scarfed on the upper and lower surfaces and both side surfaces because usually there exist cracks, burrs and other defects on and near the surfaces of said materials, and many scarfing apparatuses and methods have been developed and put to use. Nevertheless, all of the apparatus and methods are applicable only to rolled metal materials having an extremely simple shape, such as blooms, billets, and slabs, and rolled members having complicated contours such as H-shaped steel members are all scarfed manually under existing circumstances.

In additoin, as well known, rolled H-section steel has various merits in strength and economy and therefore is considered to be hereafter demanded increasingly in architectural, civil and other engineering fields. Such being the case, the above-mentioned manual methods require large treating equipment and high costs, and in view of the hot scarfing of rolled materials also, it is necessary to develop mechanical operations as soon as possible. However, the cross-sectional shape of rolled H-steel includes, as shown in FIG. 1a, a grade θ along the flange portion (a) up to the flange tip (b) and a large curvature at the corner portion (c), thus being far more intricate than the shapes of simple-shaped blooms, billets and so forth.

What is first considered in an attempt to carry out mechanical scarfing of such materials as mentioned above is to manufacture a scarfing nozzle unit which matches the cross-sectional shape of each of the members as shown in FIG. 6, for which an explanation will be given later, and to fit the unit to the scarfing machine. However, since rolled members to be scarfed have bends caused by rolling and cutting and it is necessary to match the unit to a number of surfaces simultaneously and for other reasons, it is very difficult to adjust the positional relationship between the material to be scarfed and the scarfing nozzle.

In addition, it is not preferable to spend a long time for the positional adjustment in view of the balance between the fall of the temperature of the rolled material and the rolling speed. Furthermore, of course the same scarfing nozzle can not be shared by members having different sizes or shapes. Hence, various nozzles must be prepared for the different sizes. Besides, a method of simplifying the above-mentioned position setting through a guage mechanism has been considered. However, the method complicates the apparatus and makes troublesome the scarfing operation, repair, maintenance, etc.

Besides, it has been proposed to form a flat nozzle 14 as shown in FIG. 7 for which an explanation will be given later, and to control the pressure of the jet from the nozzle in accordance with the grade of the material to be scarfed. However, this either is not very practical, and further the pressure control may become unstable and the scarfed surfaces may go out of order.

The above-mentioned various problems are considered to prevent the mechanization of the scarfing operation for materials having special cross-sectional shapes.

This invention aims to overcome these problematic points and to provide an extremely simplified apparatus for the scarfing of not only rolled metal members having a special shape but also prior rolled members having a simple shape such as blooms and billets, and also contemplates mechanizing the scarfing operation for rolled members having a special cross-sectional shape and enhancing the versatility of the equipment with a view to heightening the work efficiency of the eqiupment.

Furthermore, in view of the fact that an apparatus is now exclusively provided to be suitable for each of various rolled members, a single apparatus embodying the present invention so as to be applicable widely to rolled members having various shapes is greatly useful.

The present invention provides an apparatus for scarfing rolled metal members which is characterized in that a vertical slidable body is equipped with scarfing nozzles in the longitudinal and perpendicular directions of the rolled member to be scarfed and that another nozzle supporting body is provided in said slidable body so as to be vertically slidable in said slidable body, thus both bodies forming a double slidable structure and carrying the respective scarfing nozzles.

The characteristics of the present invention will be more fully understood by reference to the following description of an exemplary embodiment in conjunction with the accompanying drawings in which:

FIGS 1a–1g show the cross-sectional shapes of various steel members with the hatched portions to be scarfed;

FIG. 2 shows the overall arrangement of an apparatus embodying the present invention and an H-shaped steel member set to be scarfed by the apparatus;

FIG. 3 is an enlarged sectional view of a part of the arrangement shown in FIG. 2;

FIG. 4 is a cross-sectional view taken on line X–X' of FIG. 3;

FIG. 5 shows how the present apparatus is used to scarf a steel member having a square cross-section;

FIG. 6 shows an exemplary conventional nozzle unit for H-steel;

FIG. 7 shows another prior nozzle unit whose jetting pressure varies according to each portion of the unit; and FIG. 8 is a view showing the comparison between the nozzle unit of FIG. 6 in contact with an H-shaped steel member and a split nozzle unit of this invention which is matched to the member.

As shown in FIG. 2, a base 1 is provided below and across a member 12 to be scarfed and carries studs 2 and 3 on the right and left sides respectively. On top of the studs is mounted a sliding beam 4, which supports a left and a right horizontally movable body 5 and 5'. The bodies 5 and 5' are slidable on the sliding beam 4 by a well known means such as a pneumatic system. (Since the right and left sides of the apparatus are symmetrical, the left one only will be explained hereunder.) The horizontally movable body 5 is connected with a vertically slidable body 6, which is suspended below said sliding beam 4. The vertical sliding motion is effected by the same means as employed for the above-mentioned horizontal motion.

The slidable body 6 is equipped with a subsidiary slidable body 7, which is vertically slidable within the length of said slidable body 6; thus both bodies 6 and 7 form a double slidable structure. The double slidable construction enables two nozzle units 9 and 10 to hold one end of the member 12 to be scarfed from both the upper and lower sides. The vertically slidable body 6 and the subsidiary slidable body 7 are each furnished with a nozzle support 8, which carries a nozzle unit 9, a nozzle unit 10 and a nozzle 29. The nozzle units 9 and 10 are formed as required by the shape of the rolled material, and the nozzle 29 may be eliminated according to the contour of corner of the rolled material to be scarfed. As shown in FIG. 3, the nozzles 10 and 29 are fixed to a nozzle holder 11 by means of bolts 17 and the holder 11 is secured to the support 8 with bolts 18, while the nozzle unit 9 is directly fixed to the support 8 by means of bolts 16. In the case where the contour of the member 12 to be scarfed has an inclined angle of some degrees in respect of each of the vertical and horizontal axes, the nozzle units 9 and 10 may be of a split type, and nozzle bases 19 and 22 may have gradients for example, by using taper liner, as required by said inclined angles. Namely, in this case, the nozzle units 9 and 10 consist of the angled nozzle bases 19 and 22, the cooling blocks 20 and 23, and nozzle retainers 21 and 24. The numerals 25 and 26 represent nozzle holes and 27 and 28 denote skids riding along the surface of the member to be scarfed 12. The skids serve to keep the distance between each nozzle hole and the material 12 always constant. As shown in FIG. 4, a fuel gas pipe 30 and an oxygen pipe 31 are included in the nozzle base 19 to supply such gases as a fuel gas (e.g. acetylene) and oxygen to the nozzles. The gas supply tubes from the gas sources are connected to the connection holes 32 and 33 through suitable joints (not shown) when the nozzle units are replaced.

The practical operation of the apparatus constructed as described above will be explained hereinafter. When a rolled H-shaped steel member is scarfed, as shown in FIG. 2, the two nozzle units 9 corresponding to both half portions of the side surface of the member to be scarfed 12 are mounted on the nozzle supports 8 fixed to the vertically slidable body 6 and the subsidiary slidable body 7, and the nozzle units 10 corresponding to the upper and lower surfaces of the end portion of the member 12 are mounted on the nozzle holders 11 provided as the supporters for the nozzle units 10 and the nozzle 29. The member 12 is put on a roller table 34 shown in FIG. 2 so that the member 12 can be moved in the direction of its length by rotation of the rollers on table 34. The lower nozzle units 9 and 10 are positioned, in the figure, in front of the end of roller table 34 so that said nozzle unit 10 can easily be brought into contact with the lower portion of said member 12. By moving the vertically slidable bodies 6 and 7 and the horizontally slidable body 5 by means of a timer, the nozzle unit corresponding to the upper and lower surface of the member 12 to be scarfed are first made to come in contact with said surface and slide thereon, and thereafter the side nozzle units are made to touch the side surface of the member.

When the nozzles have been made to come in contact with the material 12 as described above, the material 12 and the combination of the nozzle units are a little different in size from each other as indicated by a broken line in FIG. 8, namely, different by a stand-off distance of r, where very slight lines have shown themselves after scarfing the material; however, the flames of the jets from the adjacent nozzles overlap each other and therefore the slight gap is of no practical significance. Thus the nozzles in the apparatus of this invention are easily adaptable even for members having complicated shapes and different sizes. In addition, a conventional nozzle unit 13 having a size a little different from that of the member 12 is indicated by a solid line in FIGS. 6 and 8 for the purpose of comparison. As seen in FIG. 8, the slight difference in size between the conventional nozzle unit 13 and the material 12 makes it impossible to scarf the material.

Although the present apparatus applied to an H-shaped steel member has been explained heretofore, it is a matter of course that the application is not limited to the H-shaped steel member only but the apparatus can be utilized to scarf members having such cross-sectional shapes as shown in FIG. 1, namely, a square (B) having a relatively small side length, a rectangle (C) having sides whose lengths are small, a circle (D), and rectangles (E, F and G) each having a relatively large side length.

For example, as shown in FIG. 5, when a member 12 having a square cross-section is to be scarfed by the present apparatus, the subsidiary slidable body 7 on the vertically slidable body 6 is made to descend and the nozzle supports fixed to both bodies 7 and 6 are equipped with the respective nozzle units 9 and 10. The vertical shift of the nozzles for leaving and following the member 12 to be scarfed can be effected by the motion of the vertically slidable body 6 only, that is, with no motion of the subsidiary slidable body 7 in respect of the former body 6. In addition, the nozzle unit 10 corresponding to the lower surface of the member 12 is fitted to the nozzle holder 11, which is provided as a nozzle unit supporter and fixed to the nozzle support 8, just as in the case of the aforesaid H-shaped steel member.

As will be apparent from the foregoing description, the apparatus of the present invention contributes to the mechanization of the scarfing operation of rolled metal member having special shapes and may serve, by having the nozzle units replaced, to scarf metallic members having a variety of shapes.

What we claim is:

1. An apparatus for scarfing rolled metal members comprising, in combination, a base, a pair of horizontally slidable bodies slidable on said base and a pair of vertically slidable bodies on said horizontally slidable bodies, a subsidiary slidable body slidably mounted on each of said vertically slidable bodies so as to be vertically slidable, a plurality of nozzles carried by each of said vertically slidable bodies and each of said subsidiary slidable bodies, said plurality of nozzles being positioned side by side and extending in both the longitudinal direction of the upper and lower surfaces of the material to be scarfed and in a plane perpendicular to the longitudinal direction, the nozzles on the vertically slidable bodies and the subsidiary slidable bodies being opposed to each other.

2. An apparatus as claimed in claim 1 further comprising a pair of studs, one mounted on each end of said base, and a sliding beam horizontally mounted on the tops of said studs, said pair of horizontally movable bodies being slidably supported by said beam, whereby said nozzles can be moved vertically and horizontally so as to contact simultaneously the upper surface and the upper portion of the side surface and the lower surface and the lower portion of the side surface of the rolled metal shapes to be scarfed by the horizontal sliding of said horizontally slidable bodies and the vertical sliding of said vertically slidable bodies and said subsidiary slidable bodies.

3. An apparatus as claimed in claim 1 and further comprising nozzle bases carried by each of said vertically slidable bodies and said subsidiary slidable bodies and directed obliquely in respect of the vertical and horizontal axes of the member to be scarfed, the plurality of nozzles being positioned in nozzle bases.

4. An apparatus as claimed in claim 1 further comprising blocks and retainers on said nozzle bases carried by each of said vertically slidable bodies and said subsidiary slidable bodies, said plurality of nozzles being incorporated in said nozzle bases, blocks and retainers.

References Cited

UNITED STATES PATENTS

| | | | |
|---|---|---|---|
| 2,290,290 | 7/1942 | Meinche | 266—23 X |
| 2,295,523 | 4/1942 | Bucknam et al. | 266—23 |
| 2,555,527 | 6/1951 | Anderson | 266—23 X |
| 2,812,174 | 11/1957 | Garrison et al. | 266—23 X |

J. SPENCER OVERHOLSER, *Primary Examiner.*

E. MAR, *Assistant Examiner.*